United States Patent
Nachenberg (12) 
(10) Patent No.: US 6,230,316 B1
(45) Date of Patent: *May 8, 2001

(54) PATCHING REBASED AND REALIGNED EXECUTABLE FILES

(75) Inventor: Carey Nachenberg, Northridge, CA (US)

(73) Assignee: Symantec Corporation, Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,516

(22) Filed: Apr. 17, 1998

(51) Int. Cl.[7] .................................................... G06F 9/45
(52) U.S. Cl. ........................................................ 717/5; 717/7
(58) Field of Search .................................. 395/703, 705, 395/707; 717/7, 5

(56) References Cited

U.S. PATENT DOCUMENTS

| | | | |
|---|---|---|---|
| 5,359,730 | * 10/1994 | Marron .................................. | 717/11 |
| 5,450,589 | *  9/1995 | Maebayashi et al. .................. | 717/7 |
| 5,481,713 | *  1/1996 | Wetmore et al. ....................... | 717/5 |
| 5,497,492 | *  3/1996 | Zbikowski et al. .................... | 713/2 |
| 5,546,586 | *  8/1996 | Wetmore et al. ....................... | 717/5 |
| 5,577,244 | * 11/1996 | Killebrew et al. ...................... | 717/3 |
| 5,583,983 | * 12/1996 | Schmitter ............................... | 717/5 |
| 5,588,143 | * 12/1996 | Stupek, Jr. et al. .................... | 717/5 |
| 5,694,566 | * 12/1997 | Nagae .................................... | 711/1 |
| 5,699,275 | * 12/1997 | Beasley et al. ...................... | 709/221 |
| 5,732,275 | *  3/1998 | Kullick et al. ........................ | 717/11 |
| 5,835,701 | * 11/1998 | Hastings ................................ | 717/5 |

FOREIGN PATENT DOCUMENTS

| | | | |
|---|---|---|---|
| WO 93/00633 | 1/1993 | (WO) | ............................ G06F/11/34 |
| WO 97/12508 | 4/1997 | (WO) . | |

OTHER PUBLICATIONS

Beem, C.; "Transforming Algebraically–Based Object Models into a Canonical Form for Design Refinement". Air Force Institute of Technology, Wright–Patterson AFB, OH, Jun. 1995.*

Hinchey, M.; Cahill, T.; "Towards a canonical specification of document structures". ACM Digital Library [online]. Proceedings of the 10th annual international conference on systems documentation in SIGDOC 1992, Feb. 1997.*

(List continued on next page.)

*Primary Examiner*—James P. Trammell
*Assistant Examiner*—Kelvin Booker
(74) *Attorney, Agent, or Firm*—Fenwick & West LLP (57) ABSTRACT

Incremental updating of a file (100) that has been rebased or realigned is accomplished through the use of a canonical form (100B). In terms of rebasing, a canonical form (100B) is one that has been rebased to a predetermined base address (104). In one embodiment this predetermined base address (104) is zero. In terms of realigning, a canonical form (100B) is one that has been realigned in a predetermined way. In one embodiment, the segments (110) of the file (100) are realigned such that there is no gap (114) between the end of one segment (110) and the start of the next segment (110). In another embodiment, the segments (110) of the file (100) are realigned to page boundaries (112) of a predetermined size. An incremental update (124) for the file (100) is determined that transforms the file from the canonical form (100B) to the desired update form (100C). The process of updating the file (100) comprises transforming the file (100) to the canonical form (100B) and applying the incremental update (124) to the canonical form (100B).

43 Claims, 7 Drawing Sheets

OTHER PUBLICATIONS

Auerbach, J.; "TACT: A Protocol Conversion Toolkit", IEEE/IEE Electronic Library [online]. IEEE Journal on Selected Areas in Communications, vol 8, Iss. 1, pp. 143–159, Jan. 1990.*

Taylor et al.; "Optimization: App Build Process". Microsoft Corporation, Microsoft Developer Network Library[online], Feb. 1998.*

Cygnus Solutions; "Debuging with GDB: The GNU source–level debugger". Cygnus Technical Publications, Accessed online Jun. 2, 1999, Retrieved from the Internet: http://www.cygnus.com., Apr. 1993.*

Coppieters, K: "A Cross–Platform Binary Diff," Dr. Dobb's Journal, May 1995, pp. 32+35–36.

O'Leary, Michael J., "Portable Executable Format", Microsoft Developer Supoort, Nov., 1997.

* cited by examiner

File With Executable Code

Fig. 1

Faulty File

Fig. 2

Rebased File

Fig. 3

Canonical Form of File

Fig. 4

Unaligned File

Realigned File

Canonical Form of File

PATCHING REBASED AND REALIGNED EXECUTABLE FILES

FIELD OF INVENTION

This invention pertains to the field of software updating. More specifically, this invention pertains to a system and method for performing an update to an executable file which has undergone rebasing or realigning.

BACKGROUND OF THE INVENTION

Some computer software publishers update their software applications (computer programs and data files associated with the programs) frequently. These updates often add new features to the applications as well as remove existing bugs. Several methods are commonly used to update software applications. The simplest of these is to distribute one entire software application to replace an older one. This full update method is simple, but expensive and inconvenient. Typically the software is distributed on some type of removable media, such as floppy disks or CD-ROMs, which are costly to produce and distribute. The time an end user must wait for the removable medium to arrive and the time it takes for the software application to install itself on a computer system are inconvenient. This inconvenience is compounded where updates occur frequently.

Because of the large size of many software applications it is generally not feasible to distribute such updates over computer networks, such as the Internet. When full updates of larger applications are distributed over the Internet, they often cause such high loads on servers that other users suffer slow-downs on the network, and the servers have trouble meeting the demands.

In order to bypass many of the problems associated with this type of software updating, some software publishers distribute incremental updates. These updates do not contain entire software applications, but rather they contain that information which is necessary to transform a particular version of a software application to a newer version. Among the methods available to perform such incremental software updating is binary patching, performed by programs such as RTPatch, published by Pocket Soft, Inc. A binary patcher changes those binary bits of a software application which are different in a newer version. Because many software updates involve changes to only a small portion of a software application, a binary patcher needs, in addition to the old software application, only a small data file which includes the differences between the two versions. The smaller data files distributed for a binary patch update are often less than 1% of the size of a full update, taking advantage of the large amount of redundancy in the two versions.

The use of incremental update methods allows for smaller updates which can be distributed by means which are not conducive to the distribution of full updates, such as distribution over the Internet. The smaller incremental updates also make distribution by floppy disk more feasible where a full update would have required many disks, and an incremental update may require only one.

Conventional incremental update methods, however, require that application files being updated conform exactly to a known pre-update version. Because binary updating occurs by moving and replacing selected bits of a file, any differences between the file being updated and the expected pre-update file can produce unpredictable results.

There are a variety of ways in which files containing executable code modules can be modified in order to operate more effectively on a particular operating system or a particular computer system. Two of these ways are "rebasing" and "realigning." Rebasing is the changing of information in a file in order to accommodate the file being loaded into memory at a new base address. Typically, rebasing involves changing absolute memory addresses which appear in code and data segments, so that the correct memory addresses appear. Realigning is the moving of code and data segments within a file such that the segments begin on particular numerical boundaries. Rebasing and realigning are explained in more detail below. Both of these forms of file manipulation create files which can be different from the original files installed on the system. When a software publisher wishes to update earlier versions of an application to a new version through incremental updating, the publisher generally assumes that the files being updated match one of a definite number of past versions. Update patches for these known versions can be produced and sent to users. If some of the application files have been rebased, realigned, or both, these application files will not be in a recognizable format for updating with the incremental update. Because the rebased or realigned file will generally not be available to the publisher of the incremental update, conventional incremental update methods are insufficient.

What is needed is a system for performing incremental updates to application files which have been rebased, realigned, or both.

SUMMARY OF THE INVENTION

The present invention is a system, computer implemented method, and computer readable medium for allowing incremental updating of a file (100) which has been rebased or realigned. A canonical form (100B) is provided. In terms of rebasing, a canonical form (100B) is one which has been rebased to a predetermined base address (104). In one embodiment this predetermined base address (104) is zero. In terms of realigning, a canonical form (100B) is one which has been realigned in a predetermined way. In one embodiment, the segments (110) of the file (100) are realigned such that there are no unused memory locations (114) between the end of one segment (110) and the start of the next segment (110). In another embodiment, the segments (110) of the file (100) are realigned to page boundaries (112) of a predetermined size.

An incremental update (124) for the file (100) is determined which transforms the file (100) from the canonical form (100B) to the desired update form (100C). The process of updating the file (100) comprises transforming the file (100) to the canonical form (100B) and applying the incremental update (124) to the canonical form (100B), resulting in the desire update form (100C).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

To overcome the problem of incrementally updating files which have been rebased, realigned, or both, a canonical form is utilized. A canonical form is a predetermined form such that, given a set of files which are each equivalent to the others in the set, the canonical form of any file in the set is identical to the canonical form of any other file in the set. The utility of a canonical form is that non-identical files, if equivalent to each other, are identical when put into a canonical form. A file which is rebased is functionally equivalent to the original file; the executable code in the file operates the in the same manner before and after rebasing. Similarly, a file which has been realigned is functionally equivalent to the original form of the file. A file put into a canonical form will be identical to an equivalent file that has been put into the canonical form, regardless of any rebasing or realigning that had been performed on the files prior to being put into the canonical form. Because a canonical form is designed to eliminate the differences between equivalent files, the definition of any particular canonical form depends on the form of equivalence being preserved. In the illustrative embodiment, equivalences between rebased files and equivalences between realigned files are utilized. Other equivalences will be apparent to those skilled in the art.

All updating is performed on files which have been put into a canonical form. In order to explain the attributes of the canonical forms in the illustrative embodiment of the present invention, it is necessary to first describe rebasing and realigning in some detail.

Rebasing

Figure 1:
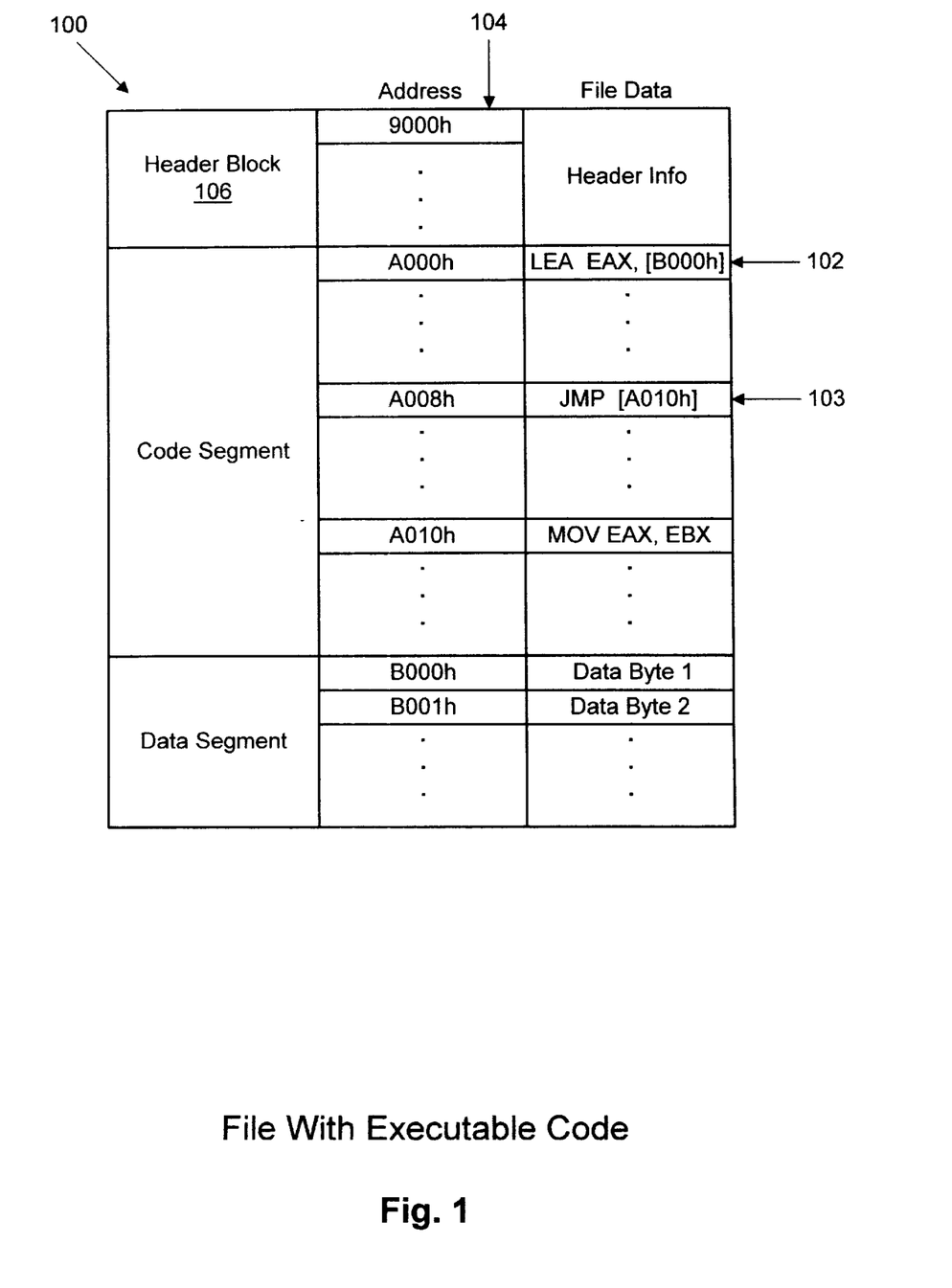
FIG. 1 is an illustration of a file 100 which includes executable code.
Figure 2:
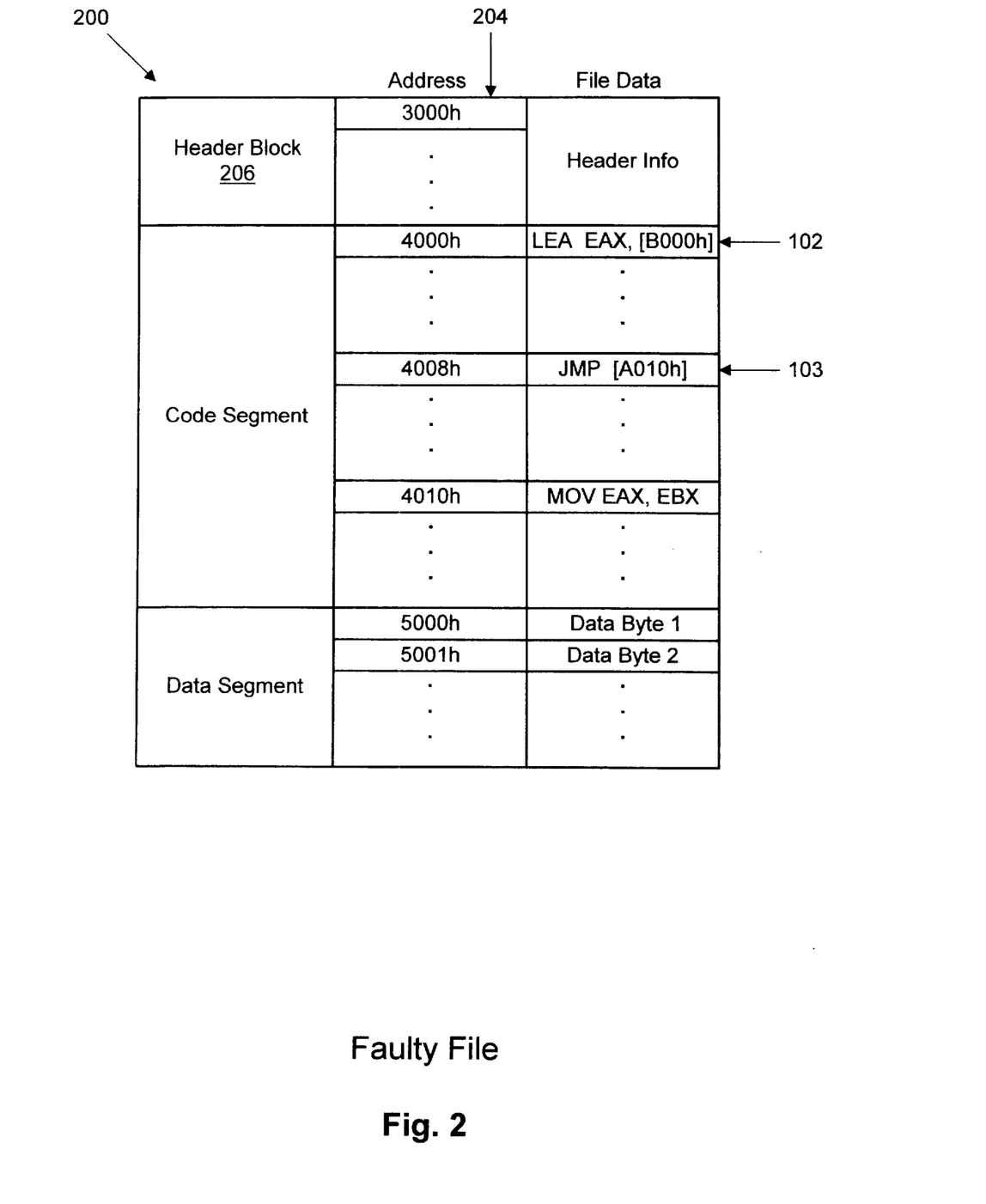
FIG. 2 is an illustration of a file 100 for which the base address 104 has been changed without changing references 102 to absolute memory addresses.

Referring now to FIG. 1, file 100 (which may be, for example, a standard executable file or a dynamic link library) contains executable code which contains references 102 to absolute memory addresses which are within the memory intended to be occupied by file 100. These references 102 are premised on the assumption that file 100 will be loaded into memory at a particular predetermined address 104 (the "base"). In the case of file 100 in FIG. 1, base address 104 is 9000h (all addresses in hexadecimal). Sometimes, however, it is not possible to accommodate file 100 by loading it into the intended base address 104. For example, if one dynamic link library is already loaded at base address 104 and file 100 is being loaded, file 100 cannot be loaded at address 104. As illustrated in FIG. 2, changing the base address 104, without modifying absolute memory references 102, would result in the code failing to function properly. Where data is read from a fixed address, the wrong data will be read. A jump to a fixed address will begin executing the wrong code. Therefore, such file 100 is rebased, if possible, to accommodate being loaded at a different base address 104. The rebasing can take place in Random Access Memory (RAM) at run-time, or it can be performed once, with the rebased file being saved in place of the original file 100.

Figure 3:
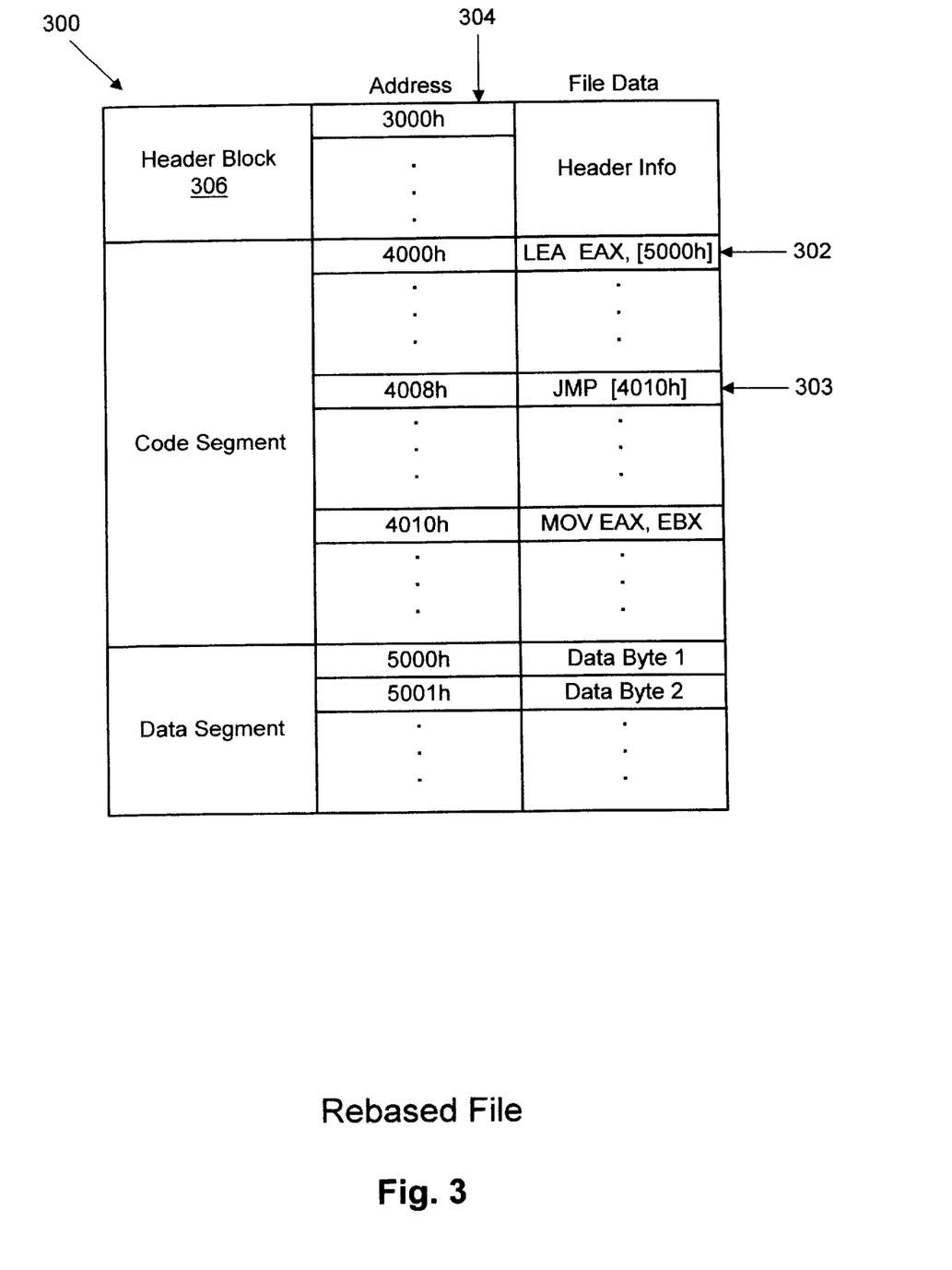
FIG. 3 is an illustration of a file 100 which has been rebased.

As is typical of files which are capable of being rebased, file 100 contains a header block 106 at the beginning of file 100 which indicates which memory references 102 within file 100 need to be modified to account for the change in base address 104. The rebasing is carried out by reading header block 106 and modifying each such memory reference 102 to reflect the new base address 104. FIG. 3 illustrates a properly rebased form of file 100 from FIG. 1. The difference between the old base address 104 and the new base address 104 has been applied to all absolute memory references 102. Executable files and dynamic link libraries conforming to the Portable Executable ("PE") format generally can be rebased in this way. The rebasing process takes a period of time which, when performed at run-time, is undesirable. When the rebasing is carried out by an operating system at run-time, the effect is that the execution of the code within file 100 is delayed.

The run-time delay associated with rebasing can be avoided by rebasing file 100 such that it loads at a base address 104 which is expected to be vacant, and saving the rebased version of file 100 in place of the original version. When loaded, this new file 100 will generally not need to be rebased again. This kind of rebasing can be carried out on particular files by using a rebasing tool such as the "REBASE.EXE" utility produced by Microsoft Corp. A system optimization program might also be used to rebase all executable files and dynamic link libraries on a computer system in such a way as to minimize the run-time rebasing required. Such functionality might even be built into an operating system, which would rebase files on a local file system to avoid the instances of run-time rebasing.

Figure 4:
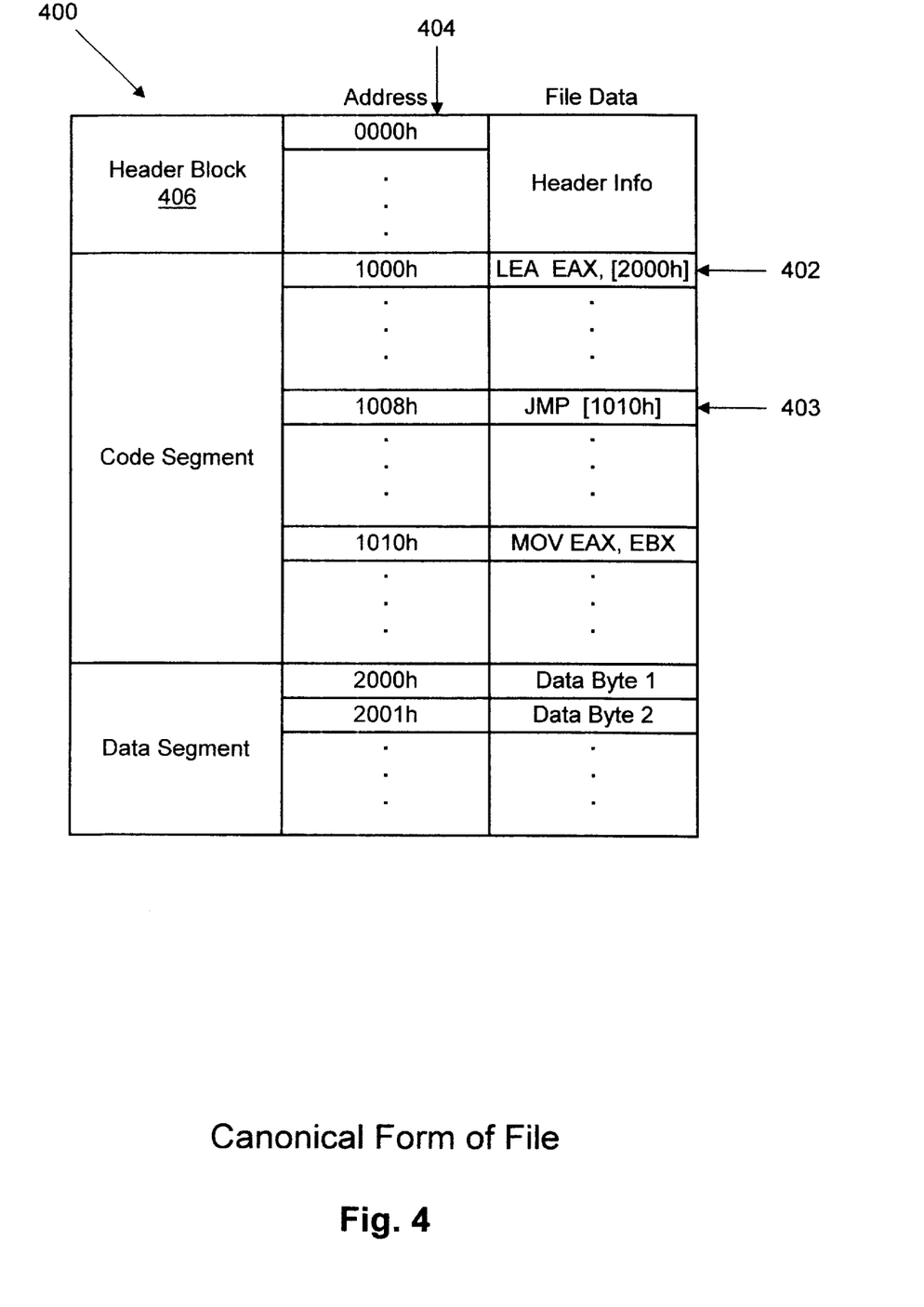
FIG. 4 is an illustration of a file 100 which conforms to the canonical form of the illustrative embodiment.

In order to ensure that file 100 is in an expected form before being updated, it is converted to the canonical form. In the illustrative embodiment, a file 100 is in the canonical form when it has been rebased to a predetermined value. This predetermined value can be included with an update, or can be set when file 100 is first published. In FIG. 4, the canonical form is one in which file 100 has been rebased to a base address 104 of zero. In other embodiments, file 100 may be rebased to any predetermined value. Although file 100 in the canonical form might not be the same as the form in which file 100 was originally distributed, this canonical form is useful as a common starting point.

Realigning

Figure 5:
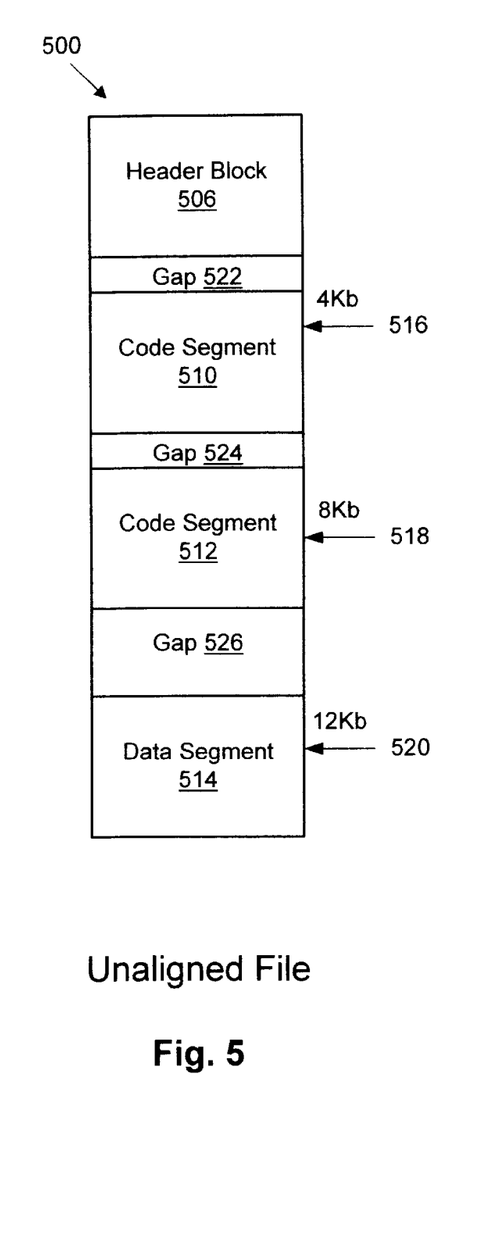
FIG. 5 is an illustration of a file 100 which does not have segments 110 aligned on page boundaries 112.

Referring now to FIG. 5, many files 100 containing executable code include multiple code and data segments 110. In a typical file format, these code and data segments 110 follow header block 106 at the beginning of file 100. In an operating system which maps file 100 to memory and uses memory pages of fixed size to move portions of file 100 in and out of memory, it is efficient for code and data segments 110 within file 100 to be aligned on memory boundaries 112 equal to the page size. For example, if the operating system uses memory pages of 4 Kb in size, and a 4 Kb code segment 110 (such as second Code Segment 110 in FIG. 5) begins at the 6 Kb address in file 100, the operating system will need to move two 4 Kb portions (4 Kb to 12 Kb) of file 100 into memory in order to load that code segment 110. If the code segment 110 were located at the 8 Kb boundary, as in FIG. 6, the segment 110 could be loaded into just one 4 Kb page of memory. By aligning code and data segments 110 in file 100 on page boundaries 112, loading of files 100 containing executable code can be accomplished more quickly.

Many files 100 containing executable code are produced which do not have code and data segments 110 aligned on page boundaries 112 corresponding to a particular operating system. Part of the reason might be that the page size of the operating system on which the application is to run may not be known at the time files 100 are compiled and linked. Some applications are produced in which no attempt is made to align segments 110 on any particular page boundaries 112.

Figure 6:
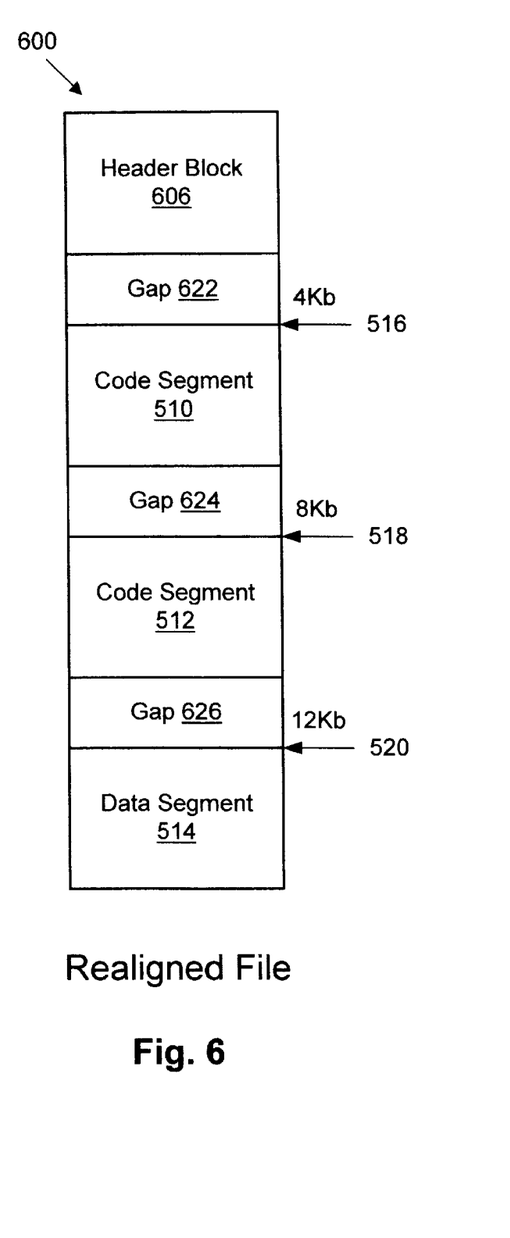
FIG. 6 is an illustration of a file 100 which has been realigned.

Files 100 which are not aligned for a particular operating system can be realigned for efficient use by that operating system after being installed on the system. The process of moving segments 110 within file 100 containing executable code is similar to the process of rebasing. Information about the location of code and data segments 110 within file 100 is generally contained in header block 106. As illustrated in FIG. 6, by adding or deleting slack space 114 between segments 110, segments 110 can be made to coincide with particular page boundaries 112. After segments 110 are realigned, header block 106 is updated with the new segment addresses, and any necessary changes are made to absolute memory references 102, so that the code will function properly. This realigned file 100 then replaces the original file 100, allowing file 100 to be more quickly loaded into memory.

Figure 7:
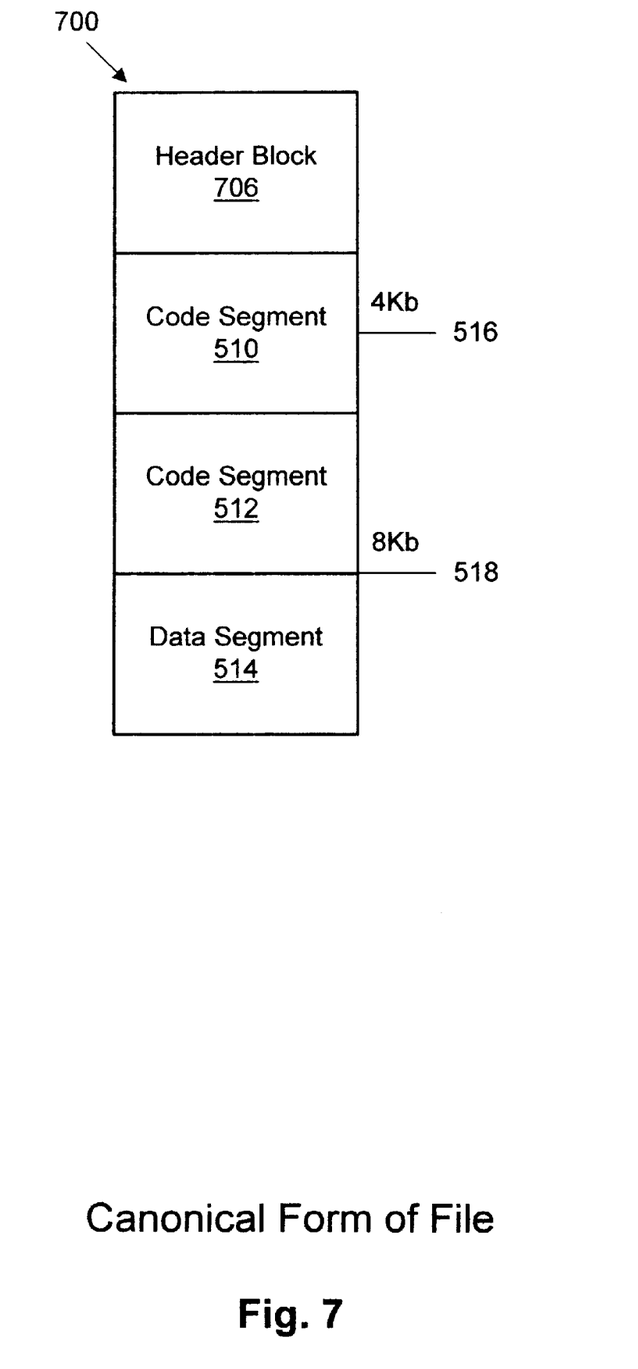
FIG. 7 is an illustration of a file 100 which conforms to the canonical form of the illustrative embodiment.

As illustrated in FIG. 7, one canonical form of file 100 is one in which all segments 110 have been moved to be contiguous. This would be analogous to realigning file 100 to one byte boundaries 112. Alternatively, any particular boundaries 112 may be determined at the time an incremental update is being calculated. Segments 110 are aligned on these boundaries 112 in the canonical form. In another embodiment, boundaries 112 are not fixed with respect to file 100, but rather are fixed with respect to the preceding segment 110. In such an embodiment, unused memory portions 114 would be specified as being a predetermined size.

Incremental Updating

Figure 8:
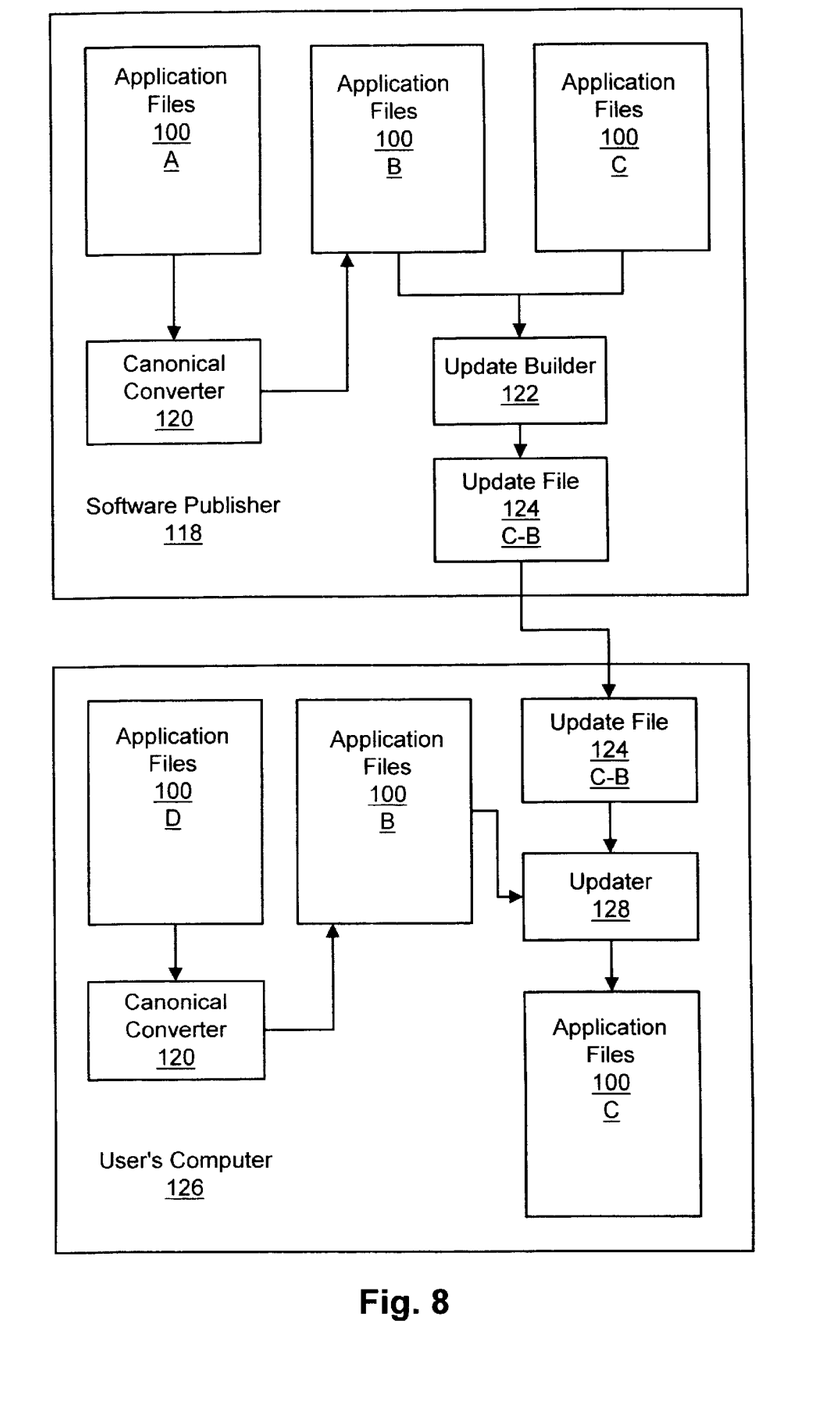
FIG. 8 is an illustration of one embodiment of the present invention.

Referring now to FIG. 8, software publisher 118 intends to update a first version of an application file 100A to a new version 100C. Because users may have files 100 which correspond to version 100A but which have been rebased or realigned, the publisher uses canonical converter 120 to produce a version 100B file from a version 100A file. Version 100B conforms to the canonical form of version 100A. Rebasing and realigning techniques such as those described above can be used by canonical converter 120. An update builder 122 then calculates the binary differences between file 100B and file 100C. Update builder 122 can be any conventional binary patch file builder which produces binary update files 124 from two versions of a file 100. The differences are used to create update file 124C-B.

Update file 124C-B is then distributed to a user who installs it on computer 126. Computer 126 also includes canonical converter 120. The pre-update version of file 100 on computer 126 has been rebased and realigned, such that it is in state 100D. Canonical converter 120 on computer 126 takes file 100D and produces canonical version 100B therefrom. Then update file 124C-B can be used by updater 128 to produce desired version 100C of the file. Updater 128 can be any conventional binary patcher which can apply patches 124 produced by update builder 122.

By converting file 100, which has been rebased, realigned, or both, to a canonical form, problems associated with returning file 100 to the original form are avoided. Because file 100 might not contain information sufficient to determine the original form, a process which operates by returning file 100 to the original form would require that patch 124 include a lot of information relating to the original form. The present invention overcomes such a situation by using an independent canonical form.

Transformations other than rebasing and realigning can give rise to equivalence and, therefore, canonical forms. For example, the code and data segments may be rearranged within a file. A canonical form which takes this into account can order the segments based on the numerical order off any distinct tags associated with the segments. Alternatively, the segments can be ordered numerically based on the content of the segments.

The above description is included to illustrate the operation of an exemplary embodiment and is not meant to limit the scope of the invention. The scope of the invention is to be limited only by the following claims. From the above description, many variations will be apparent to one skilled in the art that would be encompassed by the spirit and scope of the present invention.

What is claimed is:

1. A method for incrementally updating a file containing executable code which has undergone at least one of rebasing, realigning and rearranging, the method comprising the steps of:

converting the file to a non-original predetermined form which does not include the changes made to the executable file during the rebasing, realigning and/or rearranging; and applying to the predetermined form a patch that is adapted to convert a file from the predetermined form to the new form.

2. The method of claim 1, wherein the predetermined form is one in which code that is capable of being rebased is rebased to a predetermined base address.

3. The method of claim 2, wherein the predetermined base address is zero.

4. The method of claim 1, wherein the file comprises at least one segment, and the predetermined form is one in which each segment is located at one of a set of predetermined segment boundary addresses.

5. The method of claim 4, wherein the predetermined form is one in which code that is capable of being rebased is rebased to a predetermined base address.

6. The method of claim 5, wherein the predetermined base address is zero.

7. The method of claim 1, wherein the file comprises at least one segment, and the predetermined form is one in which each segment is located at a predetermined position with respect to any preceding segment.

8. The method of claim 7, wherein the predetermined form is one in which there is no unused memory between consecutive segments.

9. The method of claim 7, wherein the predetermined form is one in which code that is capable of being rebased is rebased to a predetermined base address.

10. The method of claim 9, wherein the predetermined base address is zero.

11. The method of claim 1, wherein the file comprises at least one segment, and the predetermined form is one in which:

there is no unused memory between consecutive segments; and code that is capable of being rebased is rebased to a base address of zero.

12. A system for incrementally updating a file containing executable code which has undergone at least one of rebasing, realigning and rearranging, the system comprising:

a file converter having access to the executable file, for producing therefrom a file of a non-original predetermined form which does not include the changes made to the executable file during the rebasing, realigning and/or rearranging; and an update module coupled to the file converter, for receiving the predetermined form therefrom, for receiving an update patch containing information about the differences between the predetermined form and the new form, and for producing therefrom a file of the new form.

13. The system of claim 12, wherein the predetermined form is one in which code that is capable of being rebased is rebased to a predetermined base address.

14. The system of claim 13, wherein the predetermined base address is zero.

15. The system of claim 12, wherein the file comprises at least one segment, and the predetermined form is one in which each segment is located at one of a set of predetermined segment boundary addresses.

16. The system of claim 12, wherein the file comprises at least one segment, and the predetermined form is one in which each segment is located at a predetermine position with respect to any preceding segment.

17. A system for creating an update patch for transforming files containing executable code to a new form, the files having undergone at least one of rebasing, realigning and rearranging and the system comprising:

a file converter having access to a file, for producing therefrom a file of a non-original predetermined form which does not include the changes made to the executable files during the rebasing, realigning and/or rearranging; and an update builder module coupled to the file converter, for receiving the predetermined form therefrom, for receiving a file of the new form, and for producing therefrom an update patch containing information about the differences between the predetermined form and the new form.

18. The system of claim 17, wherein the predetermined form is one in which code that is capable of being rebased is rebased to a predetermined base address.

19. The system of claim 17, wherein the file comprises at least one segment, and the predetermined form is one in which each segment is located at one of a set of predetermined segment boundary addresses.

20. The system of claim 17, wherein the file comprises at least one segment, and the predetermined form is one in which each segment is located at a predetermined position with respect to any preceding segment.

21. A computer readable medium containing a computer program for incrementally updating a file containing executable code which has undergone at least one of rebasing, realigning, and rearranging, the file update comprising the steps of:

converting the file to a non-original predetermined form which does not include the changes made to the executable file during the rebasing, realigning and/or rearranging; and applying to the predetermined form a patch that is adapted to convert a file from the predetermined form to the new form.

22. The computer readable medium of claim 21, wherein the predetermined form is one in which code that is capable of being rebased is rebased to a predetermined base address.

23. The computer readable medium of claim 21, wherein the file comprises at least one segment, and the predetermined form is one in which each segment is located at one of a set of predetermined segment boundary addresses.

24. The computer readable medium of claim 21, wherein the file comprises at least one segment, and the predetermined form is one in which each segment is located at a predetermined position with respect to any preceding segment.

25. The method of claim 1, wherein the step of converting comprises eliminating the changes made to the executable file during the rebasing, realigning and/or rearranging.

26. The system of claim 12, wherein the file converter eliminates the changes made to the executable file during the rebasing, realigning and/or rearranging.

27. The system of claim 17, wherein the file converter eliminates the changes made to the executable file during the rebasing, realigning and/or rearranging.

28. The computer readable medium of claim 21, wherein the step of converting comprises eliminating the changes made to the executable file during the rebasing, realigning and/or rearranging.

29. A method for incrementally updating a user's file containing executable code which has undergone at least one of rebasing, realigning and rearranging, the method comprising the steps of:

creating a patch containing incremental update data;

sending the patch to user;

converting the user's file to a predetermined form which does not include the changes made to the user's file during at least one of the rebasing, realigning and rearranging; and applying the patch to the predetermined form of the user's file to thereby convert the user's file from the predetermined form to a new form.

30. The method of claim 29, wherein the predetermined form of the user's file is one in which code that is capable of being rebased is rebased to a predetermined base address.

31. The method of claim 29, wherein the user's file comprises at least one segment, and the predetermined form of the user's file is one in which each segment is located at one of a set of predetermined segment boundary addresses.

32. The method of claim 31, wherein the predetermined form of the user's file is one in which there is no unused memory between consecutive segments.

33. The method of claim 29, wherein the file comprises at least one segment, and the predetermined form of the user's file is one in which:

there is no unused memory between consecutive segments; and code that is capable of being rebased is rebased to a base address of zero.

34. A system for incrementally updating a user's file of a first form, the user's file containing executable code which has undergone at least one of rebasing, realigning and rearranging, the system comprising:

a file converter operatively associated with the first form of the user's file, the file converter converting the user's file from the first form to a second form which does not include the changes made to the user's file during the at least one of rebasing, realigning and rearranging; and an update module coupled to the file converter, for receiving the second form of the user's file, for receiving from a remote source an update patch containing information about the differences between the second form of the user's file and a third form of the user's file, and for converting the second form of the user's file into the third form.

35. The system of claim 34, wherein the second form is one in which code that is capable of being rebased is rebased to a predetermined base address.

36. The system of claim 34, wherein the user's file comprises at least one segment, and the second form is one in which each segment is located at one of a set of predetermined segment boundary addresses.

37. The system of claim 34, wherein the user's file comprises at least one segment, and the second form is one in which each segment is located at a predetermined position with respect to any preceding segment.

38. A method of incrementally updating a user's file containing executable code which has undergone at least one of rebasing, realigning, and rearranging, the method comprising the steps of:
  receiving from a remote source a patch containing incremental update data;
  converting the user's file to a predetermined form which does not include the changes made to the user's file during the at least one of rebasing, realigning and rearranging; and
  applying the patch to the predetermined form of the user's file to thereby convert the user's file from the predetermined form to an updated form.

39. The method of claim 38, wherein the predetermined form of the user's file is one in which code that is capable of being rebased is rebased to a predetermined base address.

40. The method of claim 39, wherein the user's file comprises at least one segment and the predetermined form of the user's file is one in which each segment is located at one of a set of predetermined segment boundary addresses.

41. The method of claim 39, wherein the user's file comprises at least one segment and the predetermined form of the user's file is one in which each segment is located at a predetermined position with respect to any preceding segment.

42. The method of claim 39, wherein the step of converting comprises eliminating the changes made to the executable file during the at least one of rebasing, realigning and rearranging.

43. The method of claim 39, wherein the step of converting comprises returning the executable file to its original form.

* * * * *

UNITED STATES PATENT AND TRADEMARK OFFICE
CERTIFICATE OF CORRECTION

PATENT NO. : 6,230,316 B1  
DATED : May 8, 2001  
INVENTOR(S) : Carey Nachenberg Page 1 of 1

It is certified that error appears in the above-identified patent and that said Letters Patent is hereby corrected as shown below:

<u>Title page,</u>  
References Cited, U.S. PATENT DOCUMENTS, add the following reference:  
4,956,809 *9/1990 George et al. ....................... 364/900

<u>Claim 16,</u>  
Line 3, delete "predetermine" and insert -- predetermined --.

Signed and Sealed this

Fifth Day of February, 2002

Attest:

JAMES E. ROGAN  
*Director of the United States Patent and Trademark Office*

*Attesting Officer*